April 25, 1961  D. P. SPENCER ET AL  2,981,637
COATING OF FABRICS
Filed March 31, 1958
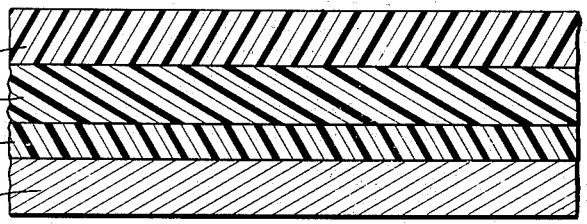
POLYVINYL CHLORIDE OR
COPOLYMER CONTAINING VINYL
CHLORIDE
VINYL TERPOLYMER
TOLUENE DIISOCYANATE
REACTION PRODUCT
POLYESTER OR POLYAMIDE
FABRIC
INVENTORS
DAVID PATRICK SPENCER
HECTOR ROLAND BOURNE
BY Imirie & Smiley
ATTORNEY

United States Patent Office 2,981,637
Patented Apr. 25, 1961

2,981,637

COATING OF FABRICS

David Patrick Spencer, 21 Marco Polo St., Essendon, Victoria, Australia, and Hector Roland Bourne, 8 Wellesley Road, Hawthorn, Victoria, Australia Filed Mar. 31, 1958, Ser. No. 724,884

Claims priority, application Australia Apr. 2, 1957

4 Claims. (Cl. 117—76)

This invention relates to the coating of fabrics composed of fibres of polymeric linear glycol terephthalate esters, polymeric linear diamine adipamides or sebacamides, or polymers of caprolactam, known as and hereinafter referred to as polyester or polyamide fabrics, with polyurethanes with or without the addition of polyvinyl chloride or copolymers of vinyl chloride.

Coated fabrics of this type are well known in the art and are used in the rainwear, tarpaulin, conveyor belting and protective clothing trades because of physical properties superior to those of the conventional coated cotton articles. These coated polyamide and polyester fabrics have been produced by a variety of processes.

One such process involves spread coating of the fabrics with a plastisol of polyvinyl chloride wherein the first spread coat contains an isocyanate to improve the adhesion of the coating. Another process utilises a copolymer of vinyl chloride and vinyl acetate in the said first spread coat in addition to the isocyanate. Another process utilises a polymeric plasticiser in the first spread coat in addition to the isocyanate. All these processes yield coatings which usually break down when subjected to 100,000 flex cycles, and which usually adhere to the base fabric with an adhesion less than 10 lbs. per inch.

Yet other processes involve coating the fabric with a condensation product of an isocyanate and an alkyd resin, such coatings being applied from a solvent solution of materials and the condensation reaction being brought about on the surface of the cloth under the influence of heat. Coatings of this type, while exhibiting good anchorage to the base fabric, generally decrease the tear strength and flexibility excessively.

Other processes involve the lamination of plastic film based on polyvinyl chloride polymer or copolymer to the surface of the fabric with a suitable adhesive. Still other processes utilise application of the above mentioned alkyd resin composition in partially condensed form.

These methods result in coatings of various degrees of adhesion and flexibility, all of which are subject in corresponding degrees to damage under flex, decreased tear strength of the base fabric or loss of flexibility in service.

It is an object of this invention to provide coated fabrics involving flexible coatings on a polyester or polyamide woven or knitted substrate that have improved properties in these respects. More specific objects are the provision of a light weight coated polyester or polyamide fabric possessed of superior physical properties, and a heavy weight coated polyester or polyamide fabric possessed of superior service life, in relation to such coated fabrics at present known.

In the accompanying drawing a polyester or polyamide fabric is shown in cross-section having a plurality of coating layers thereon. The first or base layer is composed chiefly of a toluene diisocyanate reaction product. The second layer is composed mainly of a vinyl terpolymer, and the third layer is polyvinyl chloride or a copolymer containing vinyl chloride.

In achieving the above-stated objects, the present invention provides a coating composition comprising between 5% and 30% by weight of tri-2-1'-4-(3'-isocyanate-4"-methyl-phenyl) carbamato-3 methyl pentane; between 50% and 70% by weight of the product of reaction of diethylene glycol hexane triol adipate with less than the stoichiometric proportion of a toluene diisocyanate; between 5% and 30% by weight of tri-2-1'-4-(3'-isocyanate-formed by the copolymerisation of vinyl chloride, vinyl acetate and an alpha-beta-unsaturated dicarboxylic acid of the formula $HOOC(CH_2)_mCH=CH.COOH$, where $m$ varies by whole numbers between 0 and 3, the composition limits being, by weight:

| | Percent |
|---|---|
| Vinyl chloride | 80.0 to 90.0 |
| Vinyl acetate | 19.7 to 7.0 |
| Alpha-beta-unsaturated dicarboxylic acid | 0.3 to 3.0 |

0.2% by weight of a plasticising polyester formed by the condensation of an alpha-omega dicarboxylic acid with an alpha-omega diol, an excess of hydroxy groups being present; and between 0 and 5% by weight of a catalyst which is a tertiary amine.

A typical vinyl terpolymer is marketed under the registered trademark "Vinylite" of the type designated as grade VMCH. This product consists of 86% vinyl chloride, 13% vinyl acetate and 1% maleic acid.

A typical plasticising polyester is marketed under the name "polypropylene laurate," and is the product of polymerisation of propylene glycol and adipic acid, wherein the polymerisation is stopped with lauric acid.

Pigment may, if desired, be included in the coating compositions according to the present invention.

Polyester or polyamide fabrics so coated may be marketed as a commercial product, or may have applied to them a second coating of a composition comprising by weight between 50% and 90% of a vinyl terpolymer as herein defined together with between 10% and 50% of a plasticising polyester as herein defined.

The second coating may be pigmented if desired, and the polyester or polyamide base fabric having the above two coatings applied to it may be marketed as a commercial article, or may have a third coating of polyvinyl chloride or its copolymers applied to it.

The following specific examples illustrate the invention. Throughout the specification and claims the percentage and part figures are expressed on a weight basis.

Example I

A flexible transparent coating possessing high adhesion and in no way detracting from the desired physical properties of the base-cloth was introduced on polyester fabric according to the following procedure:

A polyester fabric, weight 6 ounces per square yard, ends 28 pick 28, was doctor knife coated with the following composition:

| | Parts by weight |
|---|---|
| Partially condensed polyester formed by reaction of diethylene glycol hexane triol adipate with less than stoichiometric proportions of 2,3-toluene diisocyanate, such polyester containing 1% to 2% free hydroxyl groups | 22.00 |
| Tri-2-1'-4-(3"-isocyanato-4"-methyl phenyl)-carbamato-3-methyl pentane | 3.30 |
| "Vinylite" VMCH | 4.30 |
| N-methyl morpholine | 0.25 |
| Polypropylene laurate | 0.80 |
| Ethyl acetate | 69.35 |
| | 100.00 |

In preparation of the above composition the partially condensed polyester was first digested in 50 parts of the total 69.35 parts of ethyl acetate. Digestion was performed in a mixer of the Werber-Pfleiderer type. The vinyl resin and polypropylene laurate were dissolved in the remainder of the solvent. Immediately prior to use these solutions were admixed and the N-methyl morpholine and isocyanate were stirred into the mixture.

This preparation thickened as condensation proceeded and was used within 10 hours after admixture of the isocyanate and the amine. A longer delay than 10 hours would have given inferior results.

After application of this composition, the coating was force dried. Immediately after drying the coating was brought into a heat zone and subjected to a temperature of 100° to 120° C. for a period of 1 to 2 minutes.

The coating thus produced was clear, showed no failure when subjected to over 1,000,000 flexes, and exhibited an adhesion of 30 lbs. per inch.

A polyamide fabric could have been substituted for the polyester fabric in the above example as the base material coated.

*Example II*

To obtain an attractive dull finish, a polyester knitted fabric weight 1.5 ounces per square yard was coated by the doctor knife method with approximately 1 ounce per square yard of a coating composition as described in Example I which has been modified by the addition of 7 parts per 100 parts of a suspension with the following composition:

| | Percent |
|---|---|
| Non-oxidising alkyd resin marketed under registered trademark "Paralac 245" | 96.0 |
| Colloidal silica | 2.8 |
| Zinc naphthenate | 1.2 |

This suspension was incorporated in the coating mass just prior to its use.

After evaporation of solvents and exposure to a temperature of 120° C. for between 1 and 2 minutes the coated fabric, weight 2 ounce per square yard, possessed good pliability, dull finish, and a degree of transparency. Physical properties of the base fabric were not unduly impaired by the coating process and the product withstood 1,000,000 flexes without failure of the coating and exhibited adhesion to the base fabric of 30 lbs. per inch. "Paralac 245" consists of polypropylene benzoate which is a product of condensation polymerisation of propylene glycol and adipic acid wherein the polymerisation is stopped by the addition of benzoic acid.

*Example III*

A polyester fabric as described in Example I was coated with a composition as described therein, with the exception that the composition contained from 10 to 100 parts per 100 parts of partially condensed polyester, of a reinforcing carbon black pigment.

In the preparation of this composition the pigment was dispersed into the partially condensed polyester on a two roll rubber mill according to techniques well known to the trade, prior to its incorporation in a portion of the ethyl acetate.

The composition was then prepared, spread on to the fabric according to the method described under Example I, and subjected to the heat treatment therein described.

Most usual pigments may be used in place of the reinforcing carbon black pigment.

In the case of basic pigments, 0.5% basic lead sulphate and 0.5% citric acid (based on the vinyl terpolymer) are included in the composition.

*Example IV*

The coating as described in Example I was used as a basic for a second coating according to the following procedure:

A polyamide fabric was first coated with the composition of Example I and under the conditions therein described, so that 0.25 ounce per square yard of dry composition was deposited. A further 0.1 ounce per square yard dry weight was then spread on the fabric utilising the following composition:

| | Percent by weight |
|---|---|
| "Vinylite" VMCH | 20 |
| Polypropylene laurate | 4 |
| Ethyl acetate | 76 |
| | 100 |

If desired, pigment could have been included in this composition, to provide a pigmented second coating.

The cloth having the above two coats applied to it may be sold as a commercial article having similar properties to the products obtained in Examples I and II.

*Example V*

The coated cloth as prepared in Example IV was top-coated with plasticised vinyl compositions by conventional methods used in the industry, e.g. calendering, spreading or lamination. This product showed an adhesion between the base fabric and coating mass, of at least 25 lbs. per inch and was not physically broken down by over 1,000,000 flex cycles. In addition the tear strength and the wearing properties of the polyamide fabric were retained while the decorative potential of the vinyl top-coat enhances its commercial potential.

*Example VI*

A polyester fabric was coated with the same three coats as used for the polyamide fabric in Example V with similar satisfactory results.

Having now described our invention, what we claim as new and desire to secure by Letters Patent is:

1. A coating composition comprising between 5% and 30% by weight of tri 2-1'-4-(3'-isocyanato-4''-methylphenyl)carbamato-3 methyl pentane; between 50% and 70% by weight of the product of reaction of diethylene glycol hexane triol adipate with less than the stoichiometric proportion of a toluene diisocyanate; between 5% and 40% by weight of a vinyl terpolymer formed by the copolymerisation of vinyl chloride, vinyl acetate and an alpha-beta-unsaturated dicarboxylic acid of the formula $HOOC(CH_2)_m CH=CH.COOH$, where $m$ varies by whole numbers between 0 and 3; the composition limits being, by weight:

| | Percent |
|---|---|
| Vinyl chloride | 80.0 to 90.0 |
| Vinyl acetate | 19.7 to 7.0 |
| Alpha-beta-unsaturated dicarboxylic acid | 0.3 to 3.0 |

0.2% by weight of a plasticising polyester formed by the condensation of an alpha-omega dicarboxylic acid with an alpha-omega diol, an excess of hydroxy groups being present; and up to 5% by weight of a catalyst which is a tertiary amine.

2. A composition as claimed in claim 1, wherein the plasticising polyester is polypropylene laurate which is the product of polymerisation of propylene glycol and adipic acid, the polymerisation being stopped with lauric acid.

3. A method of coating a fabric selected from the group consisting of polyester and polyamide fabrics comprising the steps of: applying to the fabric a base coat of the coating composition as claimed in claim 1; then applying to the base-coated fabric a second coat consisting of a composition comprising by weight between 50% and 90% of a vinyl tripolymer formed by the copolymerisation of vinyl chloride, vinyl acetate and an alpha-beta-unsaturated dicarboxylic acid of the formula $HOOC(CH_2)_m CH=CH.COOH$, where $m$ varies by whole numbers between 0 and 3, the composition limits being, by weight:

| | Percent |
|---|---|
| Vinyl chloride | 80.0 to 90.0 |
| Vinyl acetate | 19.7 to 7.0 |
| Alpha-beta-unsaturated dicarboxylic acid | 0.3 to 3.0 | together with between 10% and 50% by weight of a plasticising polyester formed by the condensation of an alpha-omega dicarboxylic acid with an alpha-omega diol, an excess of hydroxy groups being present; and then applying to the coated fabric a surface coating selected from the group consisting of polyvinyl chloride and copolymers containing polyvinyl chloride.

4. A fabric selected from the group consisting of polyester and polyamide fabrics having applied to it a base-coat consisting of a composition as claimed in claim 1; superposed on said base-coat a second coat consisting of a composition comprising by weight between 50% and 90% of a vinyl terpolymer formed by the copolymerisation of vinyl chloride, vinyl acetate and an alpha-beta-unsaturated dicarboxylic acid of the formula $HOOC(CH_2)_m CH=CH.COOH$, where $m$ varies by whole numbers between 0 and 3, the composition limits being, by weight:

| | Percent |
|---|---|
| Vinyl chloride | 80.0 to 90.0 |
| Vinyl acetate | 19.7 to 7.0 |
| Alpha-beta-unsaturated dicarboxylic acid | 0.3 to 3.0 | together with between 10% and 50% by weight of a plasticising polyester formed by the condensation of an alpha-omega dicarboxylic acid with an alpha-omega diol, an excess of hydroxy groups being present; and superposed on said second coat a surface coating selected from the group consisting of polyvinyl chloride and copolymers containing polyvinyl chloride.

References Cited in the file of this patent

UNITED STATES PATENTS

| | | |
|---|---|---|
| 2,606,162 | Coffey et al. | Aug. 5, 1952 |
| 2,650,212 | Windemuth | Aug. 25, 1953 |
| 2,676,164 | Charlton et al. | Apr. 20, 1954 |
| 2,698,838 | Simon et al. | Jan. 4, 1955 |

FOREIGN PATENTS

| | | |
|---|---|---|
| 147,989 | Australia | Sept. 1, 1952 |
| 203,836 | Australia | Oct. 5, 1956 |
| 712,053 | Great Britain | July 14, 1954 |
| 775,878 | Great Britain | May 29, 1957 |